(12) United States Patent
Cantrell (10) Patent No.: US 12,248,565 B2
(45) Date of Patent: Mar. 11, 2025

(54) REAL-TIME AND INDEPENDENT CYBER-ATTACK MONITORING AND AUTOMATIC CYBER-ATTACK RESPONSE SYSTEM

(71) Applicant: Siemens Industry, Inc., Alpharetta, GA (US)

(72) Inventor: Allen Cantrell, Blountville, TN (US)

(73) Assignee: Siemens Industry, Inc, Alpharetta, GA (US)

( * ) Notice: Subject to any disclaimer, the term of this patent is extended or adjusted under 35 U.S.C. 154(b) by 245 days.

(21) Appl. No.: 17/759,211

(22) PCT Filed: Jan. 8, 2021

(86) PCT No.: PCT/US2021/012573
§ 371 (c)(1),
(2) Date: Jul. 21, 2022

(87) PCT Pub. No.: WO2021/150379
PCT Pub. Date: Jul. 29, 2021

(65) Prior Publication Data
US 2023/0057332 A1    Feb. 23, 2023

Related U.S. Application Data

(60) Provisional application No. 62/964,259, filed on Jan. 22, 2020.

(51) Int. Cl.
*G06F 21/55*    (2013.01)
*H04L 9/40*    (2022.01)

(52) U.S. Cl.
CPC ........ *G06F 21/552* (2013.01); *H04L 63/0263* (2013.01); *G06F 2221/034* (2013.01)

(58) Field of Classification Search
CPC ............. G06F 21/552; G06F 2221/034; H04L 63/0263
See application file for complete search history.

(56) References Cited

U.S. PATENT DOCUMENTS 6,061,798 A * 5/2000 Coley ................. H04L 63/0227
726/12
9,426,169 B2 * 8/2016 Zandani .................. G06F 21/57
(Continued)

FOREIGN PATENT DOCUMENTS

CN     1960376 A    5/2007
CN    101185063 A    5/2008
(Continued)

OTHER PUBLICATIONS

PCT International Search Report and Written Opinion of International Searching Authority mailed Apr. 13, 2021 corresponding to PCT International Application No. PCT/US2021/012573 filed Jan. 8, 2021.
(Continued)

*Primary Examiner* — Saleh Najjar
*Assistant Examiner* — Devin E Almeida (57) ABSTRACT

A cyber safety system that provides a real-time and independent cyber-attack monitoring and automatic cyber-attack response. The cyber safety system comprises a cyber monitoring logic to generate a cyber attack signal in response to a cyber attack event. The cyber safety system further comprises an automatic segmentation controller to generate a plurality of segmentation voltage signals or a plurality of segmentation messages in response to the cyber attack signal. The cyber safety system further comprises a plurality of firewalls configured to invoke firewall rulesets depending upon an input voltage signal level of the plurality of segmentation voltage signals or the plurality of segmentation messages to segment a site network in a plurality of site
(Continued)

network segments and to control one or more physical devices as response to the cyber attack event.

17 Claims, 10 Drawing Sheets

(56) References Cited

U.S. PATENT DOCUMENTS

| | | | |
|---|---|---|---|
| 2002/0010679 A1* | 1/2002 | Felsher | G06F 21/6245 |
| | | | 705/51 |
| 2005/0015624 A1* | 1/2005 | Ginter | H04L 63/145 |
| | | | 726/4 |
| 2018/0063177 A1* | 3/2018 | Yamada | G06F 21/554 |
| 2019/0036958 A1* | 1/2019 | Shi | H04L 63/1466 |
| 2020/0021560 A1* | 1/2020 | Hefley | G06F 21/552 |
| 2020/0045063 A1* | 2/2020 | Zhang | H04L 63/1416 |

FOREIGN PATENT DOCUMENTS

| | | |
|---|---|---|
| CN | 105227559 A | 1/2016 |
| CN | 109714312 A | 5/2019 |

OTHER PUBLICATIONS

Zhang Ruizhe et al: "Research and Realisation of Automotive Electronic System Safety Monitoring Technology", Sep. 15, 2018.

* cited by examiner

Operational Requirements

| Reliable Attack Detection Mechanism(s) | Equipment Grouping | Network Topology |
|---|---|---|
| • Next Generation Firewall Technology<br>  • Inline deep packet inspection<br>  • Machine learning capability<br>  • Intrusion detection<br>  • Intrusion prevention<br>• Endpoint device protection with messaging<br>• Optional Messaging server | • Individual Machines<br>• Dependent machine groupings (machines that require interactivity)<br>• Emergency equipment grouping(s) | • Separation of IT and OT networking layers<br>• Defined interfacing network components (i.e., a Next Generation Firewall(s) between IT and OT<br>• Defined networking interface component for each machine or machine group<br>• Defined connectivity to emergency equipment |

FIG. 10

REAL-TIME AND INDEPENDENT CYBER-ATTACK MONITORING AND AUTOMATIC CYBER-ATTACK RESPONSE SYSTEM

BACKGROUND

1. Field

Aspects of the present invention generally relate to a real-time and independent cyber-attack monitoring and automatic cyber-attack response system.

2. Description of the Related Art

Cyber-attacks on production plants and operational technology facilities, cost customers and economies billions of dollars in losses each year and the number of attacks and resultant costs are increasing each year. Cybercrime related damage is projected to reach $6 trillion annually by 2021, as concerns for cybersecurity risks are increasing. Cyberattacks are constantly on the rise, putting missions, and lives at risk. Now more than ever, it is crucial to be proactive, and protect government installations and industrial sites.

The WannaCry ransomware attack infected approximately 230,000 computers globally. The ransomware spread to computer systems in 150 countries. In one specific instance, a site with 25 automation controllers required more than 2,000 working hours to eradicate and remediate all of the IT and OT computer systems in the facility.

Typically, the response to cyber-attacks have been a combination of anti-virus, endpoint control, and monitoring tools plus manual interaction. The issue with these solutions is that individually none completely solve or provide an adequate response to the cyber-attack plus they are always connected to the network where the attack malware resides leaving them vulnerable for repeated attempts by the malware to defeat them. Some customers have used combinations of these products in an attempt to provide an adequate response. However, when the Operational Technology (manufacturing) area of a facility is involved, many components in this space neither support anti-virus or endpoint solutions leaving these spaces open for attack if they are networked with the entire facility or provide data to a cloud environment. Monitoring solutions require manual response efforts which are slow and usually too late which results in infection of the Operational Technology equipment. A severe attack can cost millions of dollars to recover.

Thus, improved methods and systems for monitoring and handling cyber-attacks are desired.

SUMMARY

Briefly described, aspects of the present invention relate to an independent monitoring, high speed notification, and response solution for facilities under cyber-attack. At the first indication of a cyber-attack, this solution automatically notifies the facility of the attack and takes action, either automatically or allows a manual command, to isolate the Operational Technology space of a facility thus preventing disruption of production. This solution uses an industry standard Programmable Logic Controller to receive notifications of cyber-attacks via standard cyber-monitoring protocols such as SYSLOG, or via digital controls signals from commercially available anti-virus solutions, endpoint management solutions, Next Generation Firewalls, and Intrusion Prevention/Detection systems, etc. and once a notification is received, it generates a site notification of the attack, automatically isolates predetermined network sections of the facilities network to prevent spread of the attack, and executes a rule-based automation sequence to control emergency equipment, such as a backup generator, to secure the facility or continue operations. Once the facilities network is segmented, individual segments can be analyzed to see if they have been affected and returned to service according to critical priority. The advantages of the solution are that it provides an automated response, it isolates the Operational area from the malware, and it prevents the spread of the malware. The solution impacts automation products, networking products and Next Generation Firewall products used into worldwide production facilities.

In accordance with one illustrative embodiment of the present invention, a cyber safety system comprises of a cyber monitoring logic to generate a cyber attack signal in response to a cyber attack event. The cyber safety system further comprises an automatic segmentation controller to generate a plurality of segmentation voltage signals or a plurality of segmentation messages in response to the cyber attack signal. The cyber safety system further comprises a plurality of firewalls configured to invoke firewall rulesets depending upon an input voltage signal level of the plurality of segmentation voltage signals or the plurality of segmentation messages to segment a site network in a plurality of site network segments and to control one or more physical devices as response to the cyber attack event.

DETAILED DESCRIPTION

To facilitate an understanding of embodiments, principles, and features of the present invention, they are explained hereinafter with reference to implementation in illustrative embodiments. In particular, they are described in the context of a real-time and independent cyber-attack monitoring and automatic cyber-attack response system. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the real-time and independent cyber-attack monitoring and automatic cyber-attack response system according to the present disclosure are described below with reference to FIGS. 1-10 herein. Like reference numerals used in the drawings identify similar or identical elements throughout the several views. The drawings are not necessarily drawn to scale.

A cyber-attack is much like a disease. In order to control it, one must stop the spread of it as quickly as possible. In the cyber environment, the way to stop the spread of the disease is to break the network into functional segments so that each segment can be remediated individually and those that are not infected can continue operation. Real world data has shown the faster the network can be segmented results in reduced impact on downtime and thus cost which provides a higher Return on Investment (ROI) for the cyber protection solution.

An industrial fail-safe or safety system is a widely used concept where an independent separate system is used for oversight and protection to achieve equipment and life safety. This automated high-speed network segmentation solution is very much like the industrial safety system. When activated by a cyber event such as malware detection, intrusion detection, or other event dependent on the application, a cyber safety system will automatically segment the facilities network functional segments (cyber safe mode). The benefits are stopping the spread of the cyber-attack by containing the malware in network segments which will simplify the mitigation process of scanning and remediation.

The cyber safety system is an isolated separate standalone system from the network that it is protecting which means that it is less likely to be affected by the cyber-attack and that it uses digital hardwired voltage signals (preferred) or secure network messages to segment the network. A cyber safe event that triggers the segmentation can be done via a digital input (total isolated from network traffic) if the cyber-attack detection solution provides one or a cyber safe controller can receive a single secure network message (through a firewall that is integrated in the cyber safe system), such as a syslog message, and invoke an automated segmentation process.

Figure 1:
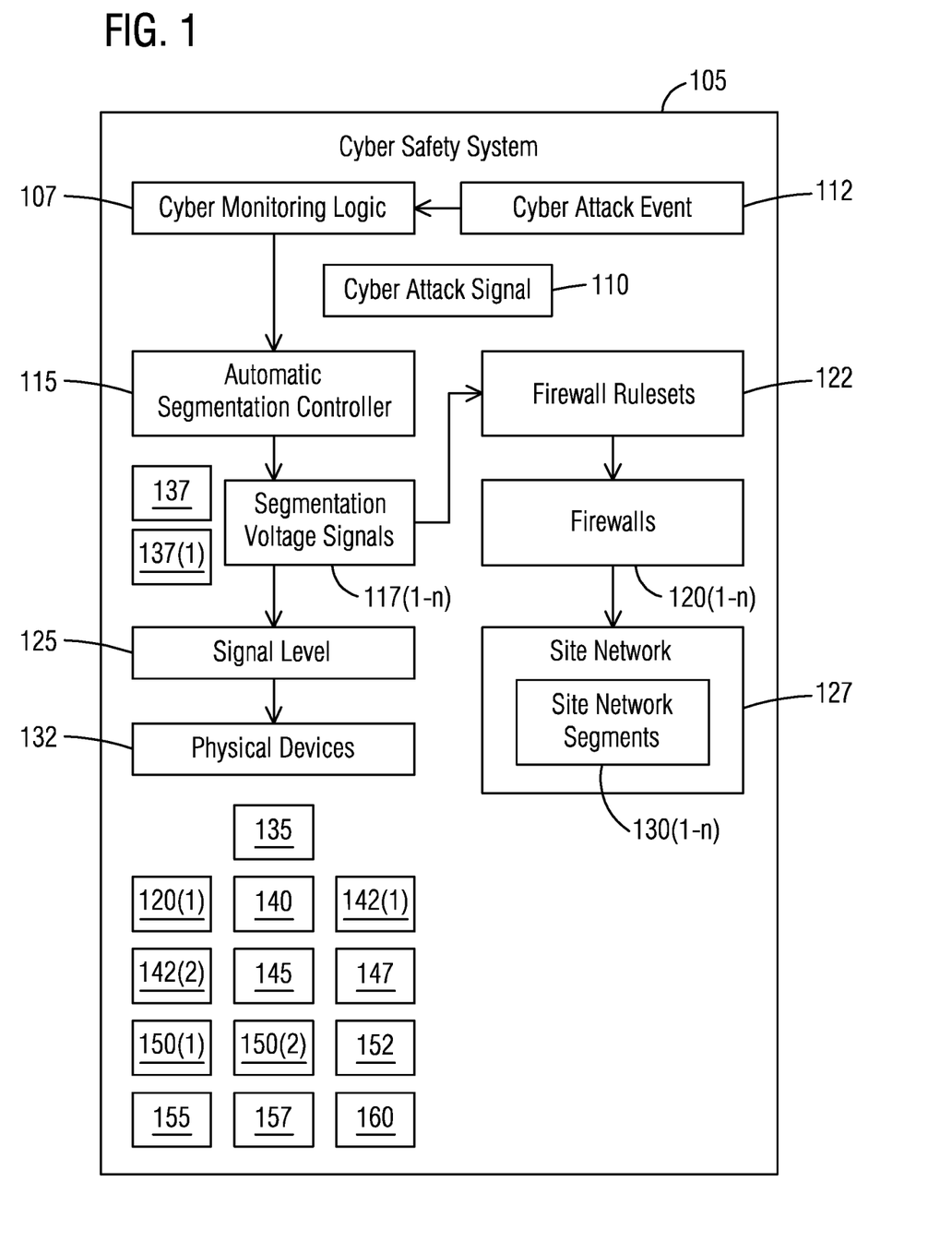
FIG. 1 illustrates a block diagram of a real-time and independent cyber-attack monitoring and automatic cyber-attack response system in accordance with an exemplary embodiment of the present invention.

Consistent with one embodiment of the present invention, FIG. 1 represents a block diagram of a cyber safety system 105 being a real-time and independent cyber-attack monitoring and automatic cyber-attack response system in accordance with an exemplary embodiment of the present invention. The cyber safety system 105 comprises a cyber monitoring logic 107 to generate a cyber attack signal 110 in response to a cyber attack event 112. The cyber safety system 105 further comprises an automatic segmentation controller 115 (e.g., a programmable logic controller (PLC)) to generate a plurality of segmentation voltage signals 117(1-n) or a plurality of segmentation messages in response to the cyber attack signal 110. The cyber safety system 105 further comprises a plurality of firewalls 120(1-n) configured to invoke firewall rulesets 122 depending upon an input voltage signal level 125 of the plurality of segmentation voltage signals 117(1-n) or the plurality of segmentation messages to segment a site network 127 in a plurality of site network segments 130(1-n) and to control one or more physical devices 132 as response to the cyber attack event 112. The cyber attack event 112 triggers the segmentation via a digital input that is totally isolated from network traffic. The cyber safety system 105 activates the firewall rulesets 122 in network security devices using digital outputs. The cyber safety system 105 provides a sub-second response to a cyber attack after notification.

The cyber safety system 105 is an isolated separate stand-alone system from the site network 127 that is it protecting. The cyber safety system 105 operates independent of the site network 127. The cyber safety system 105 uses digital hardwired voltage signals 135 as the plurality of segmentation voltage signals 117(1-n) to segment the site network 127 in addition to network or segmentation messages 137. The automatic segmentation controller 115 to receive a single network message 137(1) through a firewall 120(1) that is integrated in the cyber safety system 105 to invoke an automated segmentation process 140.

The cyber safety system 105 is isolated from a site Information Technology (IT) network 142(1) to prevent being attacked. The cyber safety system 105 isolates an Operational Technology (OT) network 142(2) segments using digital outputs to firewalls or power relays. The cyber safety system 105 isolates the plurality of site network segments 130(1-n) to stop the spread of malware and prevent intruder access.

The cyber safety system 105 automatically activates an emergency backup equipment 145. The cyber safety system 105 provides a manual panic button 147 activation capability.

The cyber safety system 105 allows unaffected work cells 150(1) and equipment groups 150(2) to continue operation. The cyber safety system 105 simplifies a remediation process 152 by remedying smaller isolated equipment groups in a priority order 155. The cyber safety system 105 prevents recontamination during the remediation process 152. The cyber safety system 105 allows for a triaged remediation with a most critical being handled first.

The cyber safety system 105 provides a rule-based processing 157 to determine response actions including alarming or segmentation. The cyber safety system 105 performs emergency response actions such as activation of backup power. The cyber safety system 105 generates site alerts 160 and can interact with other sites in the event of coordinated attacks. The cyber safety system 105 activates protection based on threat levels from threat detection devices.

Figure 2:
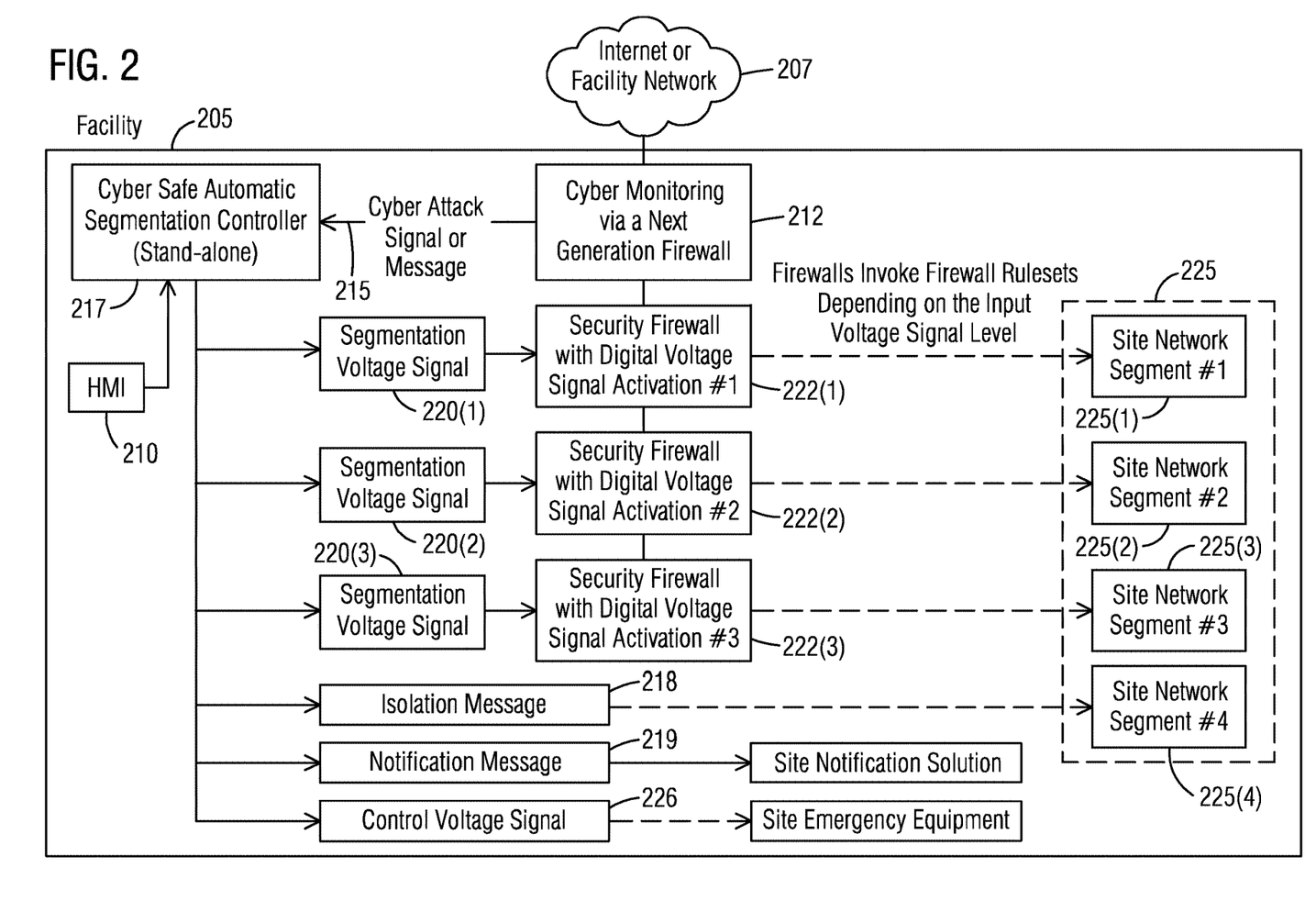
FIG. 2 illustrates a cyber safe automatic network segmentation in accordance with an exemplary embodiment of the present invention.

Referring to FIG. 2, it illustrates a cyber safe automatic network segmentation in accordance with an exemplary embodiment of the present invention. A facility 205 may be connected to the Internet or a facility network 207 via a Next Generation Firewall 212 of a cyber monitoring system that performs Cyber Monitoring. When activated by a cyber event, such as malware detection, intrusion detection, or other event dependent on the application, a cyber monitoring system 212 sends a cyber attack signal or message 215 to a Cyber Safe Automatic Segmentation Controller 217. The Cyber Safe Automatic Segmentation Controller 217 provides a plurality of Segmentation Voltage Signals 220(1-3) to a plurality of Security Firewalls 222(1-3). Firewalls invoke firewall rulesets depending on input voltage signal level to segment a site network 225 in site network segments 225(1-4). The voltage signals can also invoke control actions of facility equipment to facilitate a response to the cyber attack such as starting up backup power sources or physical protection devices. Additionally, if the facility's network segmentation firewalls do not support hardwired digital signals, the Cyber Safe Automatic Segmentation Controller 217 can transmit segmentation messages via secure isolated to the segmentation devices. An isolation message 218 may segment the site network in a segment #4 225(4). A notification message 219 may provide a site notification solution. A control voltage signal 226 may provide input to site emergency equipment.

The cyber monitoring system 212 may include a human machine interface (HMI) 210. When a cyber threat is received, the human machine interface (HMI) 210 provides notification of the cyber attack.

The cyber monitoring system 212 provides a sub-second response to a cyber-attack after notification of a cyber-attack. It's ability to interact safely with existing controllers and equipment and across sites allows for warning of coordinated attacks while isolating network segments to stop the spread of malware and prevent intruder access. With the cyber monitoring system 212, work cells and equipment groups are able to continue operation while preventing recontamination during remediation. The cyber monitoring system 212 simplifies the remediation process by allowing for a remediation process that prioritizes systems per administrative requirements.

The cyber safety system 212 can place an Operational Technology (OT) space into a safe state, isolated or quarantined, on credible notification of a cyber-attack from advanced cyber threat detection technology provided by Next Generation Firewalls, Endpoint solutions, etc. These technologies provide machine learning, artificial intelligence, intrusion detection, intrusion prevention, and malware detection to notify the cyber safety system 212 solution of a credible cyber-attack. The cyber safety system 212 then initiates a rule-based equipment management sequence to protect the equipment. Rapid assessment and remediation can then be performed on prioritized equipment groups without the risk of contamination. The cyber safety system 212 will initiate emergency measures in response to the cyber attack so the facility 205 can prepare for a worst case scenario.

The cyber safety system 212 automation technology responds in a few milliseconds. The cyber safety system 212 operates independent of the site network 225. Upon receiving a cyber-attack notification, the cyber safety system 212 performs a strategically predetermined automatic action sequence.

The cyber safety system 212 provides notification of a cyber-attack via lights, sirens, emails, and text messages. The cyber safety system 212 can be activated manually by a security officer. The cyber safety system 212 automatically activates emergency backup equipment. The cyber safety system 212 provides a "panic button" activation capability. The cyber safety system 212 works with modern technology (e.g. AI and machine learning). The cyber safety system 212 works with antiquated technology (e.g. Ethernet hubs). Recovery can be one segment at a time or a "restore all" function. The cyber safety system 212 is isolated from the site IT network to prevent being attacked. The cyber safety system 212 uses technology that OT personnel understand. The cyber safety system 212 has all the benefits of an industrial solution (speed, reliability, determinism, availability, security, etc.).

The cyber safety system 212 uses rule-based processing to determine response actions based on the requirements of each facility. Following the detection of a cyber attack, the cyber safety system 212 uses Operational Technology to activate firewall rulesets in security devices using digital outputs or can manage legacy networks by controlling the power to network devices. The cyber safety system 212 can then perform emergency response actions to prepare the facility defense, continued operation, and remediation. All responses are configurable using administrator privileges on the cyber safety system 212 Human Machine Interface 210. In the event of a coordinated attack, the cyber safety system 212 has the ability to interact with other sites using appropriate communication technology to ensure broad-based security and protection.

Figure 3:
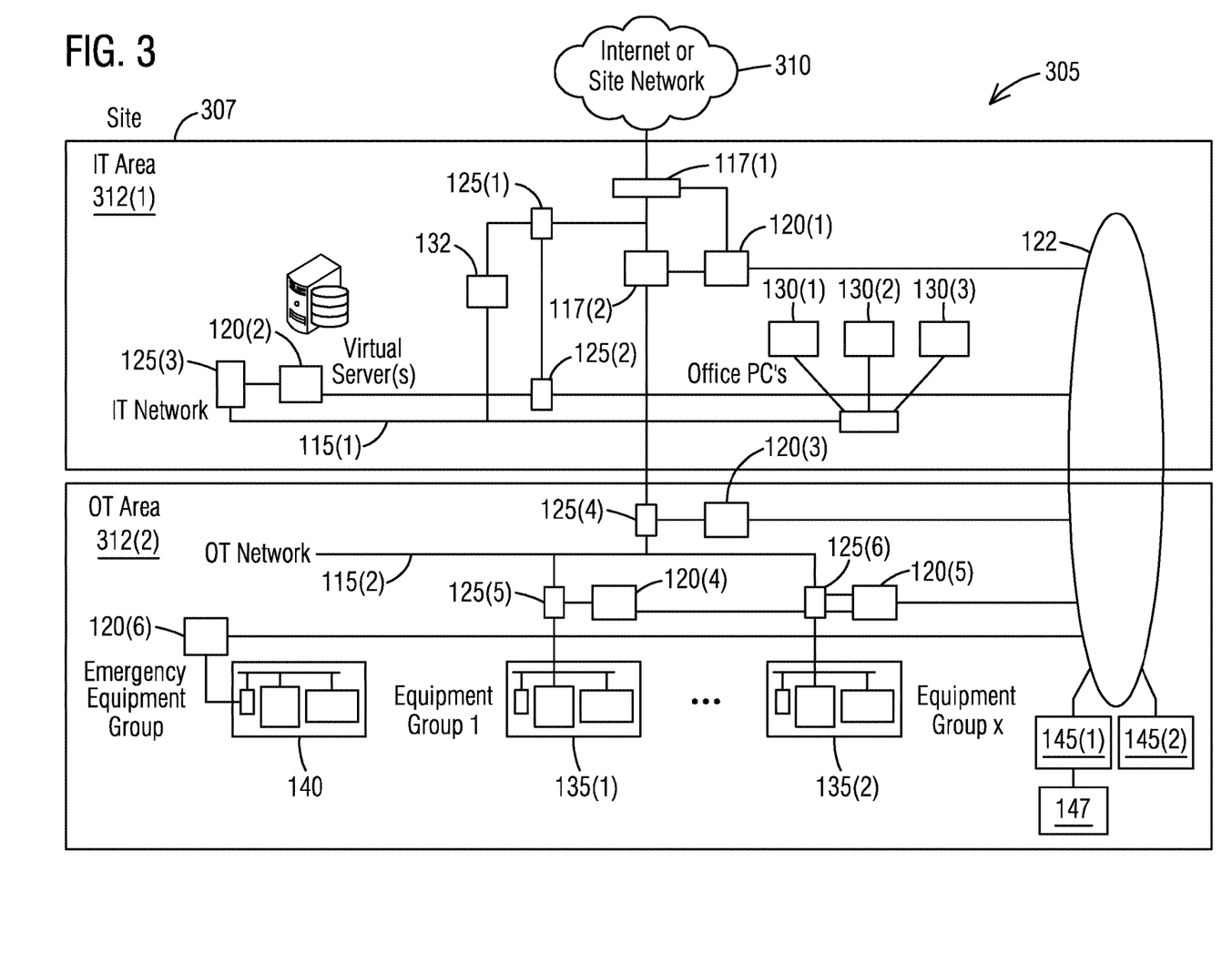
FIG. 3 illustrates a rapid automatic cyber response system for Operational Technology (OT) systems in accordance with an exemplary embodiment of the present invention.

Turning now to FIG. 3, it illustrates a rapid automatic cyber response system 305 for Operational Technology (OT) systems in accordance with an exemplary embodiment of the present invention. FIG. 3 depicts an advanced architecture that uses Next Generation Firewalls from different suppliers to increase the probability of threat detection. The threat detection from each is delivered to a threat processing engine via separate independent secure firewalls. Threat processing is performed by fault-tolerant CPUs (Programmable Logic Controllers). A fault-tolerant threat processing engine communicates via a redundant isolated ring to automation field devices that generate digital signals to isolate network segments on a credible threat. Note that the capability to protect devices such as IT type equipment (servers in this example) is provided in addition to the isolation of production cell operational equipment groups. In one embodiment, an emergency equipment group can be automatically controlled in response to a cyber threat—by the threat detection processors.

A site 307 is connected to Internet 310 such that the site 307 includes an IT area 312(1) and an OT area 312(2). The IT area 312(1) includes an IT network 115(1) and the OT area 312(2) includes an OT network 115(2). The IT network 115(1) includes a first IT firewall protection device 117(1) and a second IT firewall protection device 117(2), both storing a Next Generation Firewall each. These diverse Next Generation Firewalls are configured for detection of malware or intrusion.

The second IT firewall protection device 117(2) is connected to a first automation device 120(1) which couples the cyber threats to an isolated threat control ring network 122. The IT network 115(1) includes a first isolation device 125(1) and a second isolation device 125(2), both storing an independent firewall each. An independent firewall in the first isolation device 125(1) receives credible cyber events and notifies the cyber response system 305 via secure encrypted messages. An independent firewall in the second isolation device 125(2) provides a redundant interface for cyber events to the rapid automatic cyber response system 305 redundant CPUs via a second set of secure encrypted messages. A third isolation device 125(3) is connected to virtual server(s) to isolate them from a cyber-threat.

A second automation field device 120(2) allows isolation of the IT network 115(1) by the isolated threat control ring network 122. One or more office PCs 130(1-3) may be connected to the IT network 115(1). A security log analyzer 132 may be provided in the IT network 115(1) and may be used to preprocess threat messages prior to transfer to the cyber response system 305. A fourth isolation device 125(4) and a third automation device 120(3) provides isolation of the OT area 312(2). In the OT network 115(2), a fifth isolation device 125(5) and a fourth automation device 120(4) provides isolation of a first equipment group 135(1) and a sixth isolation device 125(6) and a fifth automation device 120(5) provides isolation of a second equipment group 135(x). In the OT network 115(2), a sixth automation device 120(6) provides control of isolated emergency equipment 140.

In the isolated threat control ring network 122, first and second redundant CPUs 145(1-2) provide a Fault-tolerant Threat Processing Engine 147. The first redundant CPU 145(1) acts as the automatic segmentation controller 115

(e.g., a programmable logic controller (PLC)). With reference to FIG. 1, the Fault-tolerant Threat Processing Engine 147 generates the plurality of segmentation voltage signals **117(1-*n*) in response to the cyber attack signal 110. The plurality of firewalls 120(1-*n*) invoke firewall rulesets 122 depending upon the input voltage signal level 125 of the plurality of segmentation voltage signals 117(1-*n*) to segment the site network 127 in the plurality of site network segments 130(1-*n*) and to control one or more physical devices 132 as response to the cyber attack event 112. The threat detection from each is delivered to the Fault-tolerant Threat Processing Engine 147 via separate independent secure firewalls. Threat processing is performed by the fault-tolerant CPUs (Programmable Logic Controllers) 145 (1-2). The Fault-tolerant Threat Processing Engine 147** communicates via a redundant isolated ring to automation field devices that generate digital signals to isolate network segments on a credible threat.

The rapid automatic cyber response system 305 can place an Operational Technology (OT) space into a safe state on a credible notification of a cyber attack. The rapid automatic cyber response system 305 uses a continuous advanced cyber threat detection technology (machine learning, intrusion detection, intrusion prevention, etc. from advanced detection devices or software e.g. Next Generation Firewalls or Endpoint protection software) to detect creditable threats to an OT environment and then initiates a rule based OT equipment management sequence to protect the equipment in the OT space. Rapid assessment and remediation can then be performed on individual equipment groups without the risk of recontamination.

The rapid automatic cyber response system 305 uses automation technology to provide fast response times and it operates independent of a site network while isolated from the attack. Four configurations of the rapid automatic cyber response system 305 are possible including a high availability configuration as shown in FIG. 3. The rapid automatic cyber response system 305 receives cyber attack notification: from Next Generation Firewalls, from log monitoring and analysis tools, from PLC digital inputs, from isolated syslog or other messages (such as Endpoint protection software) and from a manual input. The rapid automatic cyber response system 305 takes automatic or manual action.

Figure 4:
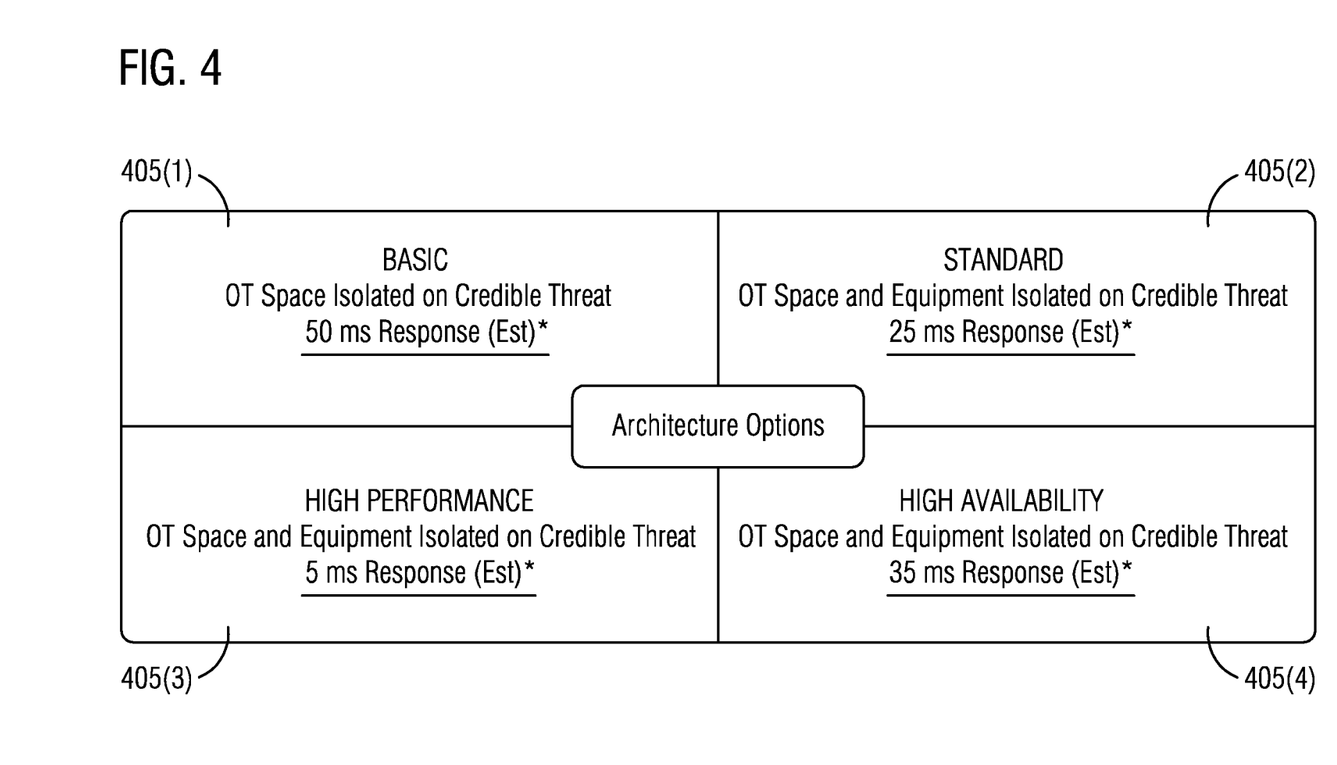
FIG. 4 illustrates Architecture Options in accordance with an exemplary embodiment of the present invention.

FIG. 4 illustrates Architecture Options 405(1-4) in accordance with an exemplary embodiment of the present invention. The Architecture Options 405(1-4) include a basic Architecture Option 405(1) in which an OT space is isolated on a credible threat in a 50 ms response time (est.). The Architecture Options 405(1-4) include a standard Architecture Option 405(2) in which an OT space and equipment is isolated on a credible threat in a 25 ms response time (est.). The Architecture Options 405(1-4) include a high performance Architecture Option 405(3) in which an OT space and equipment is isolated on a credible threat in a 5 ms response time (est.). The Architecture Options 405(1-4) include a high availability Architecture Option 405(4) in which an OT space and equipment is isolated on a credible threat in a 35 ms response time (est.).

Figure 5:
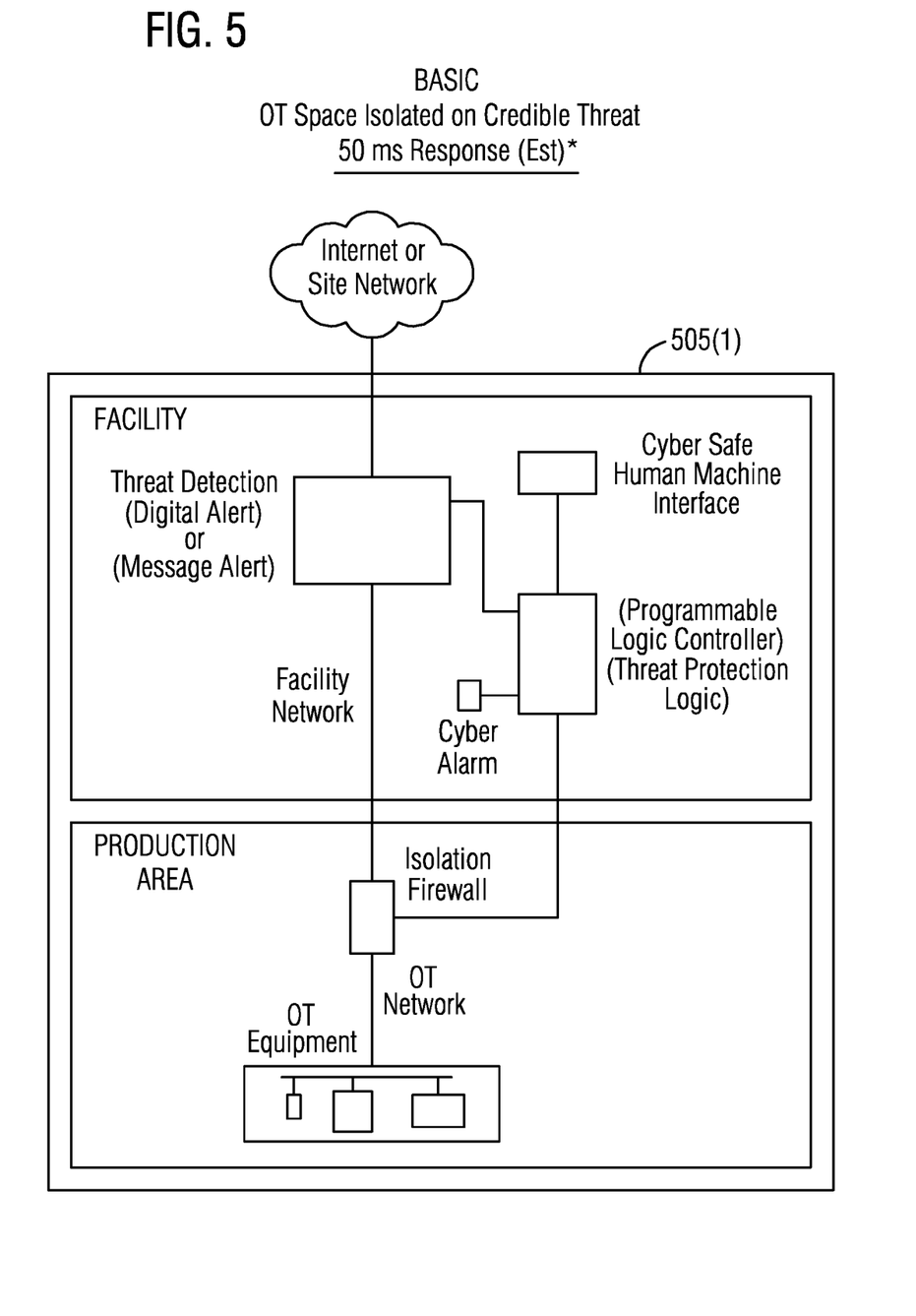
FIGS. 5-8 illustrate Architecture Option networks in accordance with an exemplary embodiment of the present invention.
Figure 6:
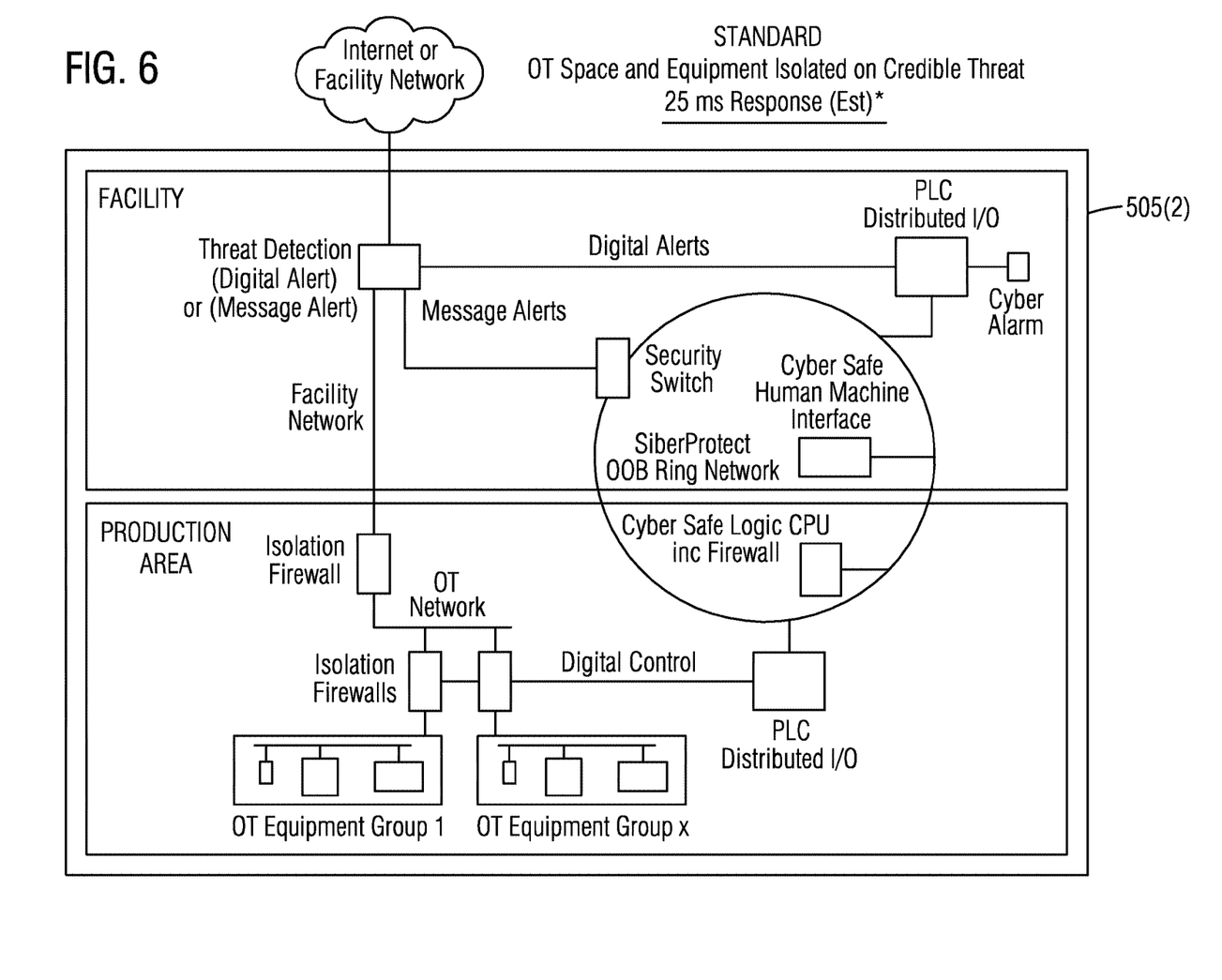
Figure 7:
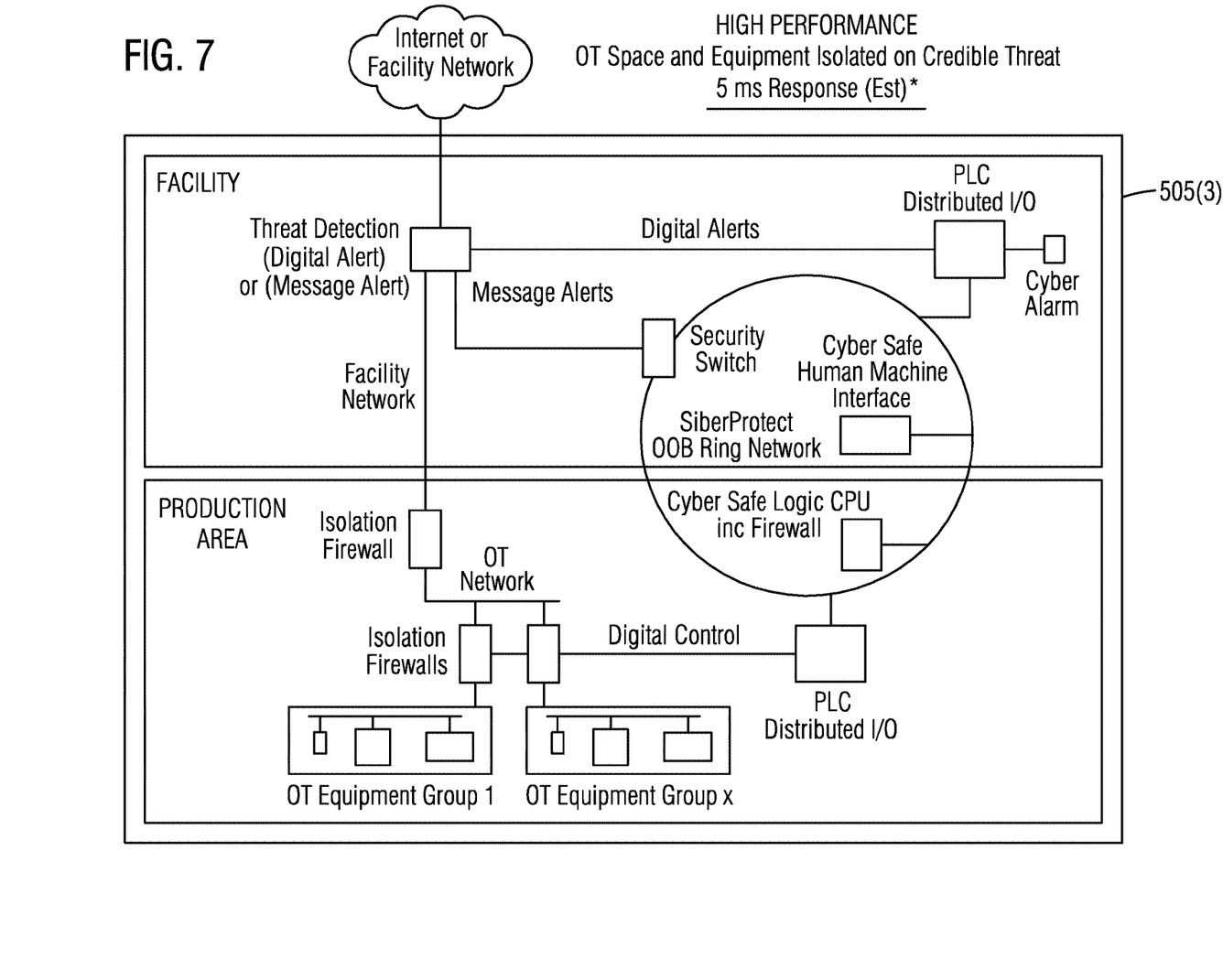
Figure 8:
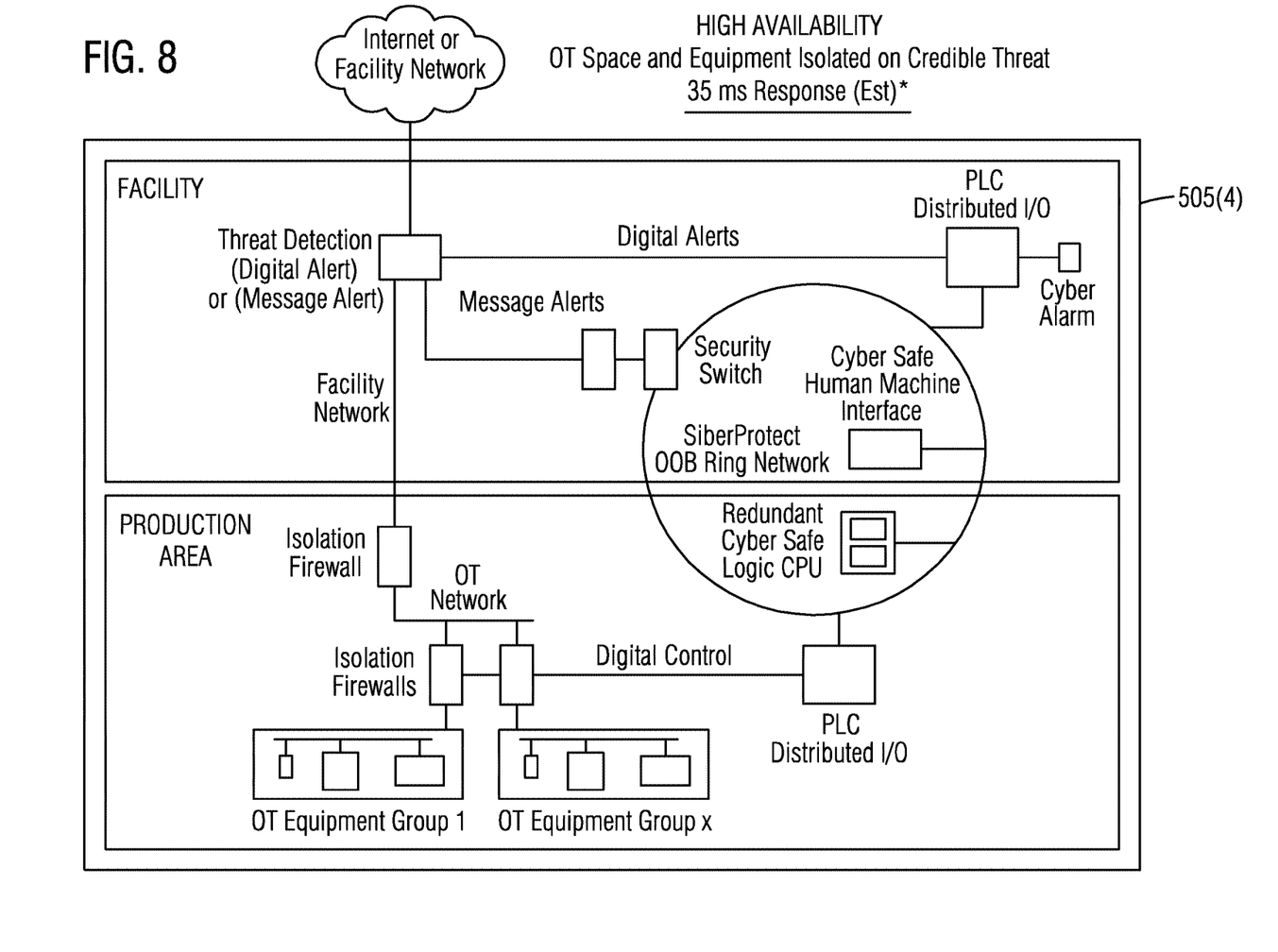

As seen in FIGS. 5-8, they illustrate Architecture Option networks 505(1-4) in accordance with an exemplary embodiment of the present invention. FIG. 5 is a basic solution which is to be used on small simple architectures where there are a small number of networks and devices or equipment groups. A smaller threat detection processor is used which results in a slower response time. FIG. 6 is a standard solution which is to be used on applications where multiple networks and devices and equipment groups are used. A threat detection processor with midrange processing power is used which results in a faster response time than the basic solution. FIG. 7 is a higher performance solution which is to be used when maximum performance is needed. A threat detection processor with extremely high processing power is used which results in the fastest response time. FIG. 8 is a high availability (redundant) solution which is to be used when zero downtime of a threat detection system can be tolerated. Although the threat detection processors are high performance, the synchronization of the logic processing results between the redundant processors creates a slower response time.

Figure 9:
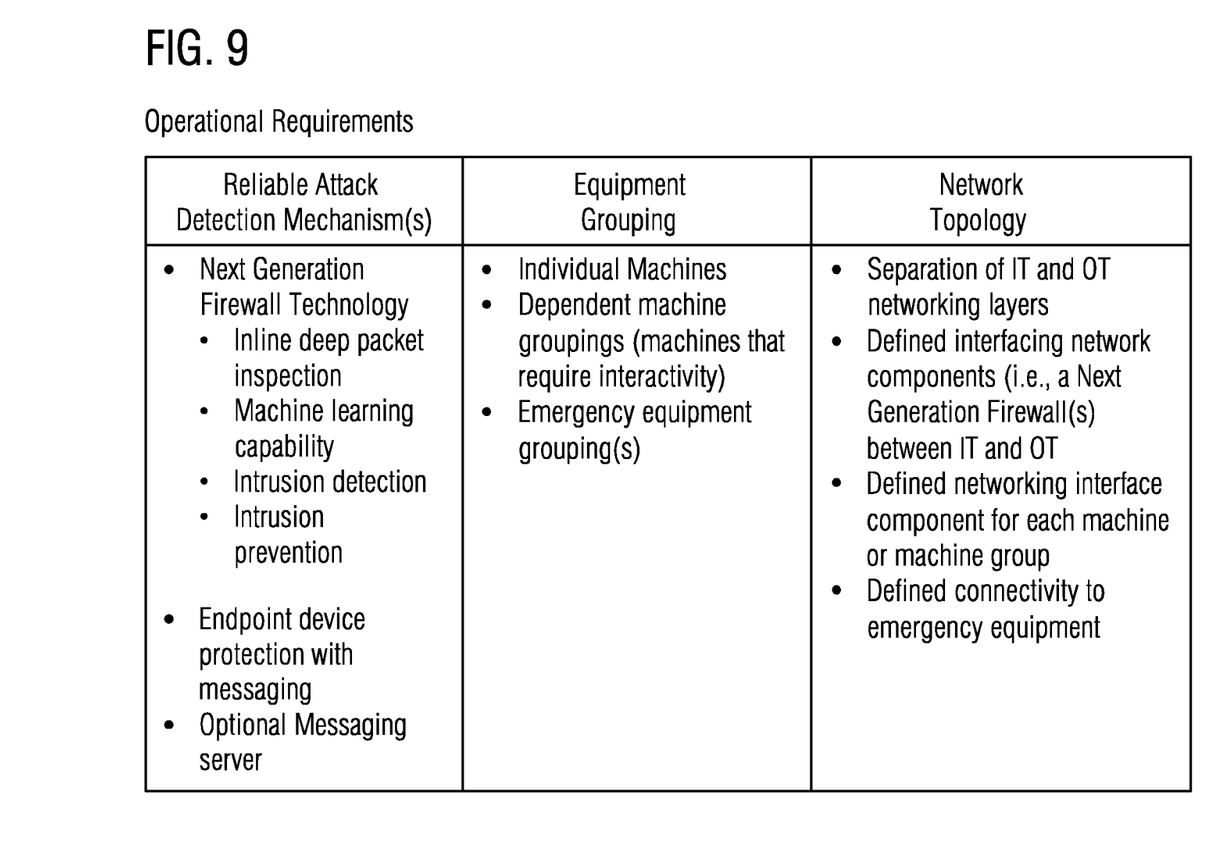
FIG. 9 illustrates Operational Requirements in accordance with an exemplary embodiment of the present invention.

As shown in FIG. 9, it illustrates Operational Requirements in accordance with an exemplary embodiment of the present invention. The Operational Requirements include reliable attack detection mechanism(s), equipment grouping and network topology. Reliable attack detection mechanism(s) include Next Generation Firewall Technology including inline deep packet inspection, machine learning capability, intrusion detection and intrusion prevention. Reliable attack detection mechanism(s) further include endpoint device protection with messaging and optional Messaging server. The equipment grouping includes individual machines, dependent machine groupings (machines that require interactivity) and emergency equipment grouping(s). The network topology includes separation of IT and OT networking layers, defined interfacing network components (i.e. a Next Generation Firewall(s) between IT and OT, defined networking interface component for each machine or machine group and defined connectivity to emergency equipment.

Figure 10:
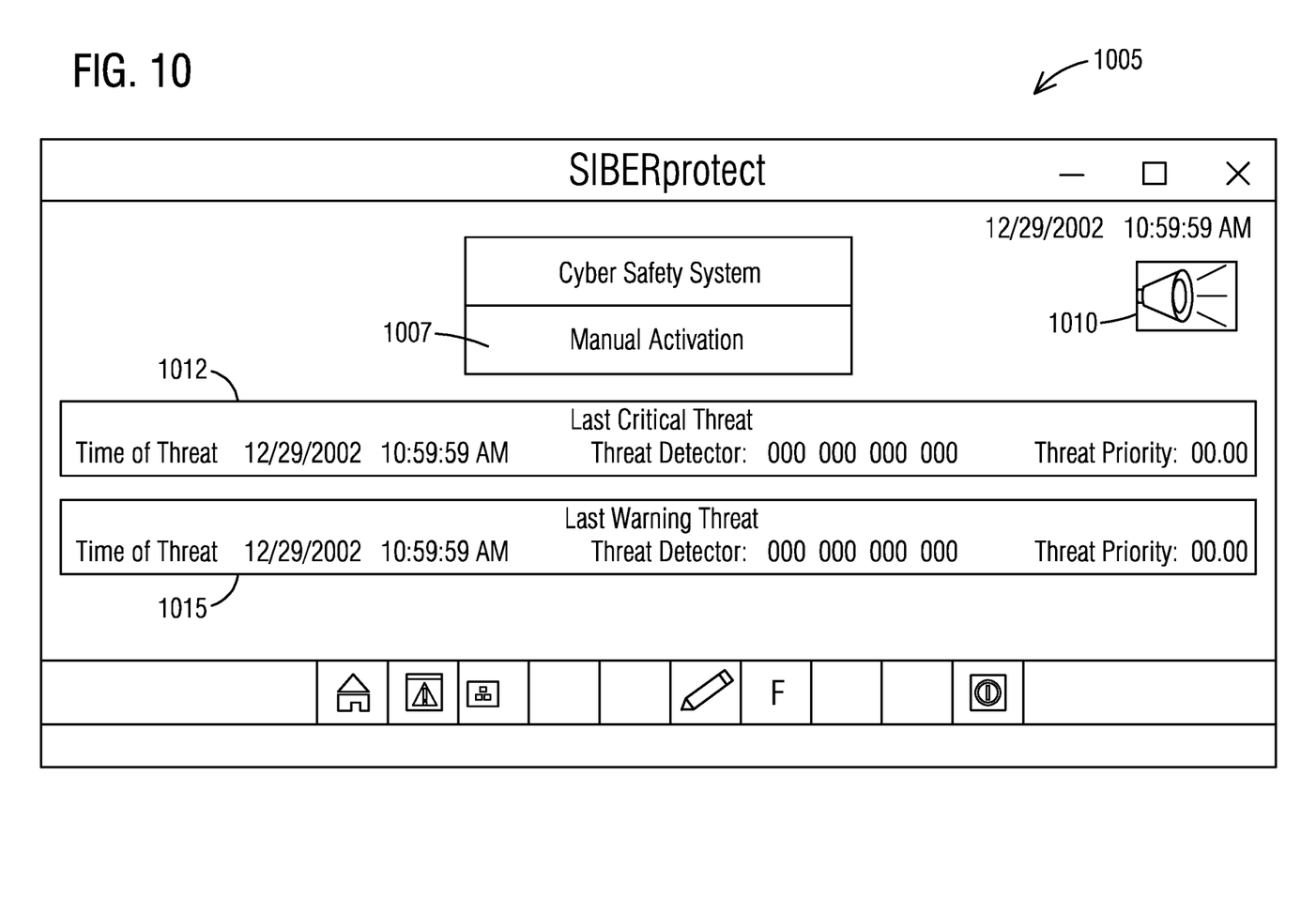
FIG. 10 illustrates a user interface to show detection of a cyber-attack in accordance with an exemplary embodiment of the present invention.

In FIG. 10, it illustrates a user interface 1005 to show detection of a cyber-attack in accordance with an exemplary embodiment of the present invention. The user interface 1005 is a human machine interface (HMI) of an automation system. It includes a button 1007 for manual activation. It also includes an audible alarm 1010. It shows a last critical (high priority) threat 1012 and a last warning threat 1015 (lower priority threat). Critical threats cause immediate action by the cyber response system 305. Warning threats are for notification but site security personnel have the option to take manual action based on the warning information.

While an automation system is described here a range of one or more other types of industrial systems or other forms of industrial systems are also contemplated by the present invention. For example, other types of industrial systems may be implemented based on one or more features presented above without deviating from the spirit of the present invention.

The techniques described herein can be particularly useful for a programmable logic controller (PLC). While particular embodiments are described in terms of specific configuration of a programmable logic controller, the techniques described herein are not limited to such a limited configuration but can also be used with other configurations and types of controllers.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description.

Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. A cyber safety system for protecting a site network, comprising:
 a cyber monitoring logic to generate a cyber attack signal in response to a cyber attack event; and
 a stand-alone automatic segmentation controller to generate a plurality of segmentation voltage signals or a plurality of segmentation messages in response to the cyber attack signal and provide them to a plurality of firewalls; and
 the plurality of firewalls configured to invoke firewall rulesets depending upon an input voltage signal level of the plurality of segmentation voltage signals or the plurality of segmentation messages to segment the site network in a plurality of site network segments and to control one or more physical devices as response to the cyber attack event,
 wherein the cyber safety system being an isolated separate stand-alone system from the site network that it is protecting,
 wherein the cyber safety system provides Architecture Options which include a basic Architecture Option in which an Operational Technology (OT) space is isolated on a credible threat in a D milli second (ms) response time, wherein the Architecture Options include a standard Architecture Option in which an OT space and equipment is isolated on a credible threat in a B ms response time, wherein the Architecture Options include a high performance Architecture Option in which an OT space and equipment is isolated on a credible threat in an A ms response time, wherein the Architecture Options include a high availability Architecture Option in which an OT space and equipment is isolated on a credible threat in a C ms response time, and wherein the D ms is greater than the C ms which is greater than the B ms which is greater than the A ms.

2. The cyber safety system of claim 1, wherein the cyber safety system uses digital hardwired voltage signals or network messages to segment the site network.

3. The cyber safety system of claim 1, wherein the cyber attack event triggers the segmentation via a digital input that is isolated from network traffic or via messages that are isolated from Information Technology (IT) and Operational Technology (OT) network traffic.

4. The cyber safety system of claim 1, wherein the automatic segmentation controller is configured to receive a network message through a firewall that is integrated in the cyber safety system to invoke an automated segmentation process.

5. The cyber safety system of claim 1, wherein the cyber safety system is isolated from a site Information Technology (IT) network to prevent being attacked.

6. The cyber safety system of claim 1, wherein the cyber safety system provides a sub-second response to a cyber attack after notification as a threat detection processor with extremely high processing power is used which results in a fastest response time.

7. The cyber safety system of claim 1, wherein the cyber safety system isolates the plurality of site network segments to stop the spread of malware and prevent intruder access.

8. The cyber safety system of claim 1, wherein the cyber safety system automatically activates emergency equipment.

9. The cyber safety system of claim 1, wherein the cyber safety system provides a manual panic button activation capability.

10. The cyber safety system of claim 1, wherein the cyber safety system allows unaffected work cells and equipment groups to continue operation.

11. The cyber safety system of claim 1, wherein the cyber safety system simplifies a remediation process by remedying smaller isolated equipment groups in a priority order.

12. The cyber safety system of claim 1, wherein the cyber safety system allows for a triaged remediation with the most critical being handled first.

13. The cyber safety system of claim 1, wherein the cyber safety system operates independent of the site network.

14. The cyber safety system of claim 1, wherein the D milli second (ms) response time is 50 ms (estimated).

15. The cyber safety system of claim 1, wherein the C ms response time is 35 ms (estimated).

16. The cyber safety system of claim 1, wherein the B ms response time is 25 ms (estimated).

17. The cyber safety system of claim 1, wherein the A ms response time is 5 ms (estimated).

* * * * *